United States Patent
Evans

(10) Patent No.: US 8,371,803 B2
(45) Date of Patent: Feb. 12, 2013

(54) FAN CASING ASSEMBLY

(75) Inventor: Dale E. Evans, Derby (GB)

(73) Assignee: Rolls-Royce PLC, London (GB)

( * ) Notice: Subject to any disclaimer, the term of this patent is extended or adjusted under 35 U.S.C. 154(b) by 615 days.

(21) Appl. No.: 12/588,914

(22) Filed: Nov. 2, 2009

(65) Prior Publication Data

US 2010/0189552 A1    Jul. 29, 2010

(30) Foreign Application Priority Data

Jan. 26, 2009    (GB) .................................. 0901145.3

(51) Int. Cl.
*F01B 25/16* (2006.01)
*F01D 21/00* (2006.01)
(52) U.S. Cl. .......................................................... 415/9
(58) Field of Classification Search .............. 415/9, 126, 415/128, 196, 197
See application file for complete search history.

(56) References Cited

U.S. PATENT DOCUMENTS

| | | | | |
|---|---|---|---|---|
| 1,629,057 A | * | 5/1927 | Theis ............................... | 116/54 |
| 3,762,833 A | | 10/1973 | Miller et al. | |
| 4,961,685 A | * | 10/1990 | Neubert ........................... | 415/197 |
| 6,053,696 A | * | 4/2000 | Roberts ............................ | 415/9 |
| 2004/0037694 A1 | * | 2/2004 | Mather ............................. | 415/9 |

FOREIGN PATENT DOCUMENTS

WO    WO 2008/135699 A2    11/2008

OTHER PUBLICATIONS

British Search Report issued in British Application No. 0901145.3; Mailed on Apr. 29, 2009.

* cited by examiner

*Primary Examiner* — Christopher Verdier
*Assistant Examiner* — Su Htay
(74) *Attorney, Agent, or Firm* — Oliff & Berridge, PLC

(57) ABSTRACT

A fan casing assembly for a gas turbine, the assembly having a fan casing for surrounding a fan, a resilient, flexible containment material around the outside of the fan casing for containing a detached fan blade that breaches the casing during a fan blade off event, and a retaining cable arrangement for resisting separation of a first and second portion of the casing as a result of the breach. The cable arrangement includes a continuous length of retaining cable extending around the fan casing on the outside of the containment material, the retaining cable being slidably or rollably secured to each of the first and second portions at a plurality of positions around the fan casing to form respective cable spans between the casing portions, there being sufficient overall slack in the cable for accommodating radial flexing of the underlying containment material upon impact of the detached fan blade.

7 Claims, 4 Drawing Sheets

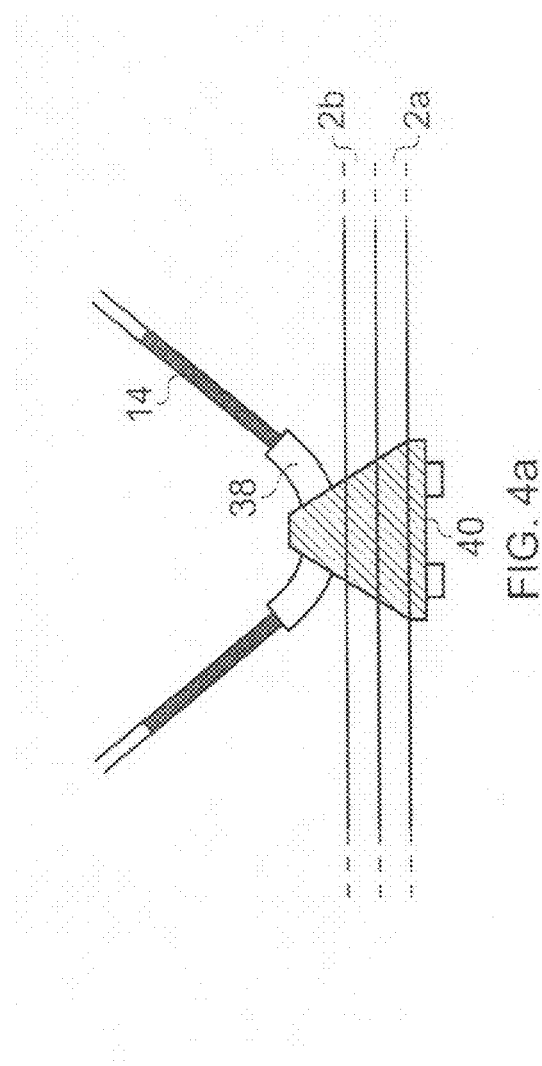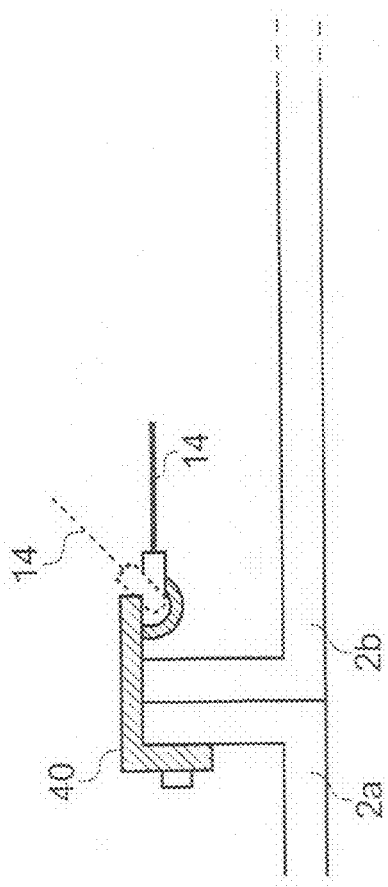

FAN CASING ASSEMBLY

The present invention relates to a fan casing assembly for a gas turbine.

Fan casings in gas turbines generally need to be designed to withstand the impact of a detached fan blade during a so-called "fan blade-off" (FBO) event, during which the detached fan blade is typically thrown against the fan casing at very high tangential velocity.

Generally speaking, there are two types of fan casing designs for mitigating the effects of FBO events: so-called "hard wall" casings and "soft wall" casings.

Hard wall fan casings rely on sufficiently high strength metallic casings, such as ribbed Armcor or Titanium casings, to contain the thrown blade(s) without catastrophic failure and to maintain the structural integrity of the casing following the fan blade impact. However, these designs inevitably carry an associated weight penalty and this is particularly a problem in aerospace applications, where the weight of the fan casing may account for as much as 5 to 10% of the total engine weight.

In soft wall fan casings, the weight is reduced significantly by using a relatively low strength fan casing, typically formed from aluminium, which is then wrapped with ballistic Kevlar®. During a fan blade impact, the fan blade breaches the aluminium, but is contained by the Kevlar® wrap, which 'catches' the blade and radially flexes to dissipate the associated impact energy in a "circumferential wave" travelling around the Kevlar Wrap®. However, although the use of a Kevlar® wrap in soft wall casings adequately compensates for the associated lightweight casing in terms of containing the fan blade at impact, the Kevlar® wrap is less effective at providing subsequent axial structural support for the casing in order to maintain the integrity of the casing post-impact. Again, maintaining structural integrity of the casing following blade impact may be particularly critical in aerospace applications.

It is an object of the present invention to seek to provide an improved fan casing assembly for a gas turbine, in particular but not exclusively for an aircraft engine.

According to the present invention there is provided a fan casing assembly for a gas turbine, the assembly comprising: a fan surrounded by a fan casing; a resilient, flexible containment material around the outside of the fan casing for containing a detached fan blade which breaches the casing during a fan blade off event, and a retaining cable arrangement for resisting separation of a first and second portion of the casing as a result of said breach, wherein the cable arrangement comprises: a continuous length of retaining cable extending around the fan casing on the outside of the containment material, the retaining cable being slidably or rollably secured to each of the first and second portions at a plurality of positions around the fan casing to form respective cable spans between the casing portions, there being sufficient overall slack in the cable for accommodating radial flexing of the underlying containment material upon impact of said detached fan blade.

The cable may be secured between the first and second casing portions in a zig-zag configuration around the outside of the fan casing.

The fan casing assembly may comprise two of said retaining cables, the cables being secured to the first and second portions of the casing in a double zig-zag configuration.

Optionally, slidable securement of the or each cable is by a flexible guide tube fixedly mounted on the respective portion of the casing. In the case of rollable securement of the or each cable, this is optionally by a pulley fixedly mounted on the respective portion of the casing.

According to another aspect of the present invention, the fan casing assembly for a gas turbine, the assembly comprising: a fan surrounded by a fan casing; a resilient, flexible containment material around the outside of the fan casing for containing a detached fan blade which breaches the casing during a fan blade off event, and a retaining cable arrangement for resisting separation of a first and second portion of the casing as a result of said breach, wherein the cable arrangement comprises: a length of retaining cable on the outside of the containment material, the length of cable being anchored at each end to a fixed anchorage on the first portion of the casing and further being slidably or rollably secured to the second portion intermediate the two ends to form respective cable spans between the casing portions, there being sufficient overall slack in the cable for accommodating radial deflection of the underlying containment material upon impact of the detached fan blade.

The length of cable may additionally be slidably or rollably secured to the second portion intermediate the two ends.

The length of cable may be slidably or rollably secured to one or both of the first and second portions at a plurality of points intermediate the two ends, optionally in a zig-zag configuration.

A plurality of said lengths of cable may be provided.

The or each cable will typically extend circumferentially around the fan casing.

In one particular embodiment, the ratio of overall slack, measured in centimeters, to the number of cable spans is around 2:1.

According to a further aspect of the invention, there is provided a gas turbine engine incorporating a fan casing assembly according to the present invention. In particular, the gas turbine engine may be an aircraft engine.

Embodiments of the invention will now be described, by way of example, with reference to the accompanying drawings, in which:

BRIEF DESCRIPTION OF THE DRAWINGS

FIGS. 4a and 4b are, respectively, a schematic plan view and corresponding side view showing one suitable arrangement for slidably securing a retaining cable in the context of the present invention.

FIG. 1 shows a fan casing assembly 1 for a gas turbine, in this case an aircraft engine.

Figure 1:
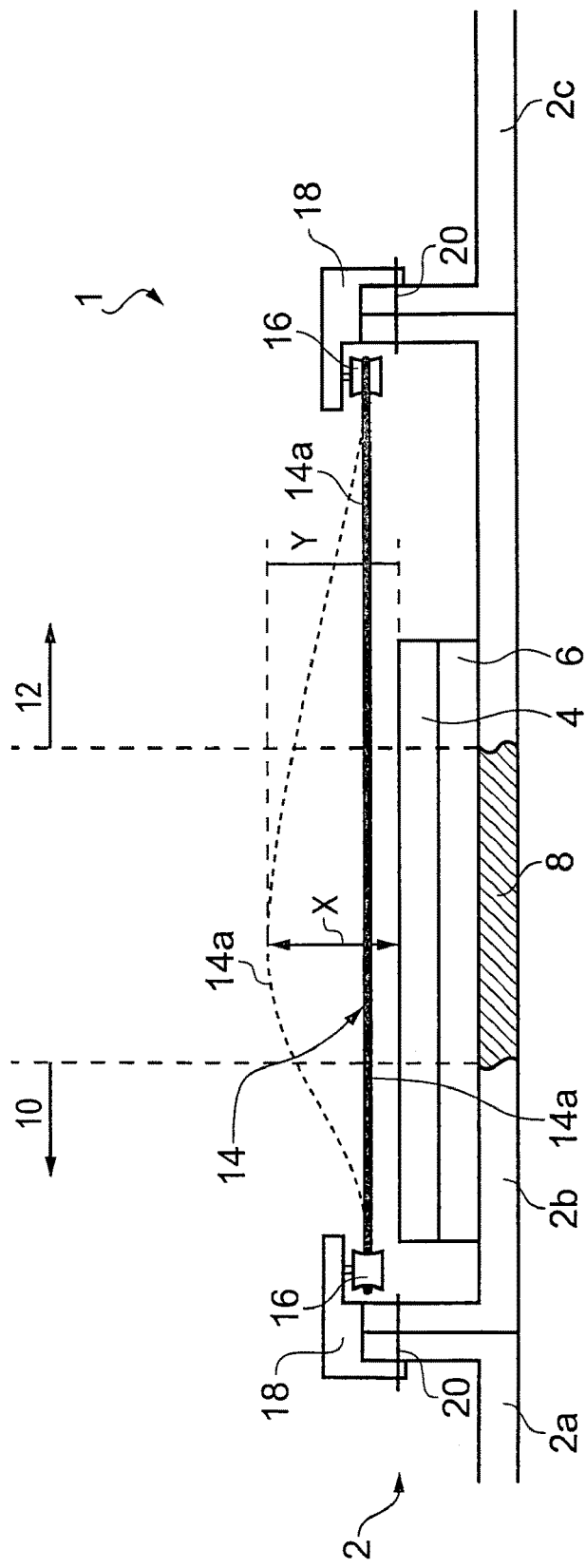
FIG. 1 is a schematic cross-sectional side view through part of a fan casing assembly according to the present invention.

The fan casing assembly 1 comprises a "soft wall" cylindrical fan casing 2 (only the upper section of which is explicitly shown in FIG. 1) comprising three casing sections: a frontal "intake" section 2a, a mid-section 2b that surrounds the blades of a respective bypass fan (not shown) and a rear section 2c. The casing 2 may be formed from any suitable "soft wall" casing material such as aluminium.

A radially flexible containment material 4, such as sheet Kevlar®, is wrapped around the outside of the mid-section 2b of the casing 2, surrounding the blades of the bypass fan. The containment material 4 is supported on composite support rails 6 (only one of which is shown in FIG. 1).

During an FBO event a fan blade will typically breach or "trepan" the casing 2, specifically the mid section 2b adjacent the rotating fan blades. The fan blade will then impact the containment material 4 at high velocity, and the containment material will radially flex to dissipate the energy of the impact before eventually returning to its rest position, as indicated by the arrows X in FIG. 1. Typically, the radial flexing of the containment material 4 will result in a circumferential "wave" of maximum initial amplitude Y (FIG. 1), feeding circumferentially around the containment material 4.

Breach of the casing mid-section 2b by the fan blade leaves a trepanned area in the casing 2, beneath the Kevlar® wrap, as indicated by the shaded area 8 in FIG. 1.

The trepanned area of the casing will tend to weaken the casing 2 between a first casing portion 10, comprising the intake section 2a and the front part of the midsection 2b, and a second casing portion 12, comprising the rear part of the mid section 2b and the rear section 2c, the latter being fixedly connected to the aircraft. For example, cracks are likely to propagate around the circumference of the casing from the breach. In order to resist consequent separation of the front casing portion 10 from the second casing portion 12 (and consequent loss of the frontal intake section 2a of the engine) the fan casing assembly 1 is provided with a retaining cable arrangement.

Figure 2:
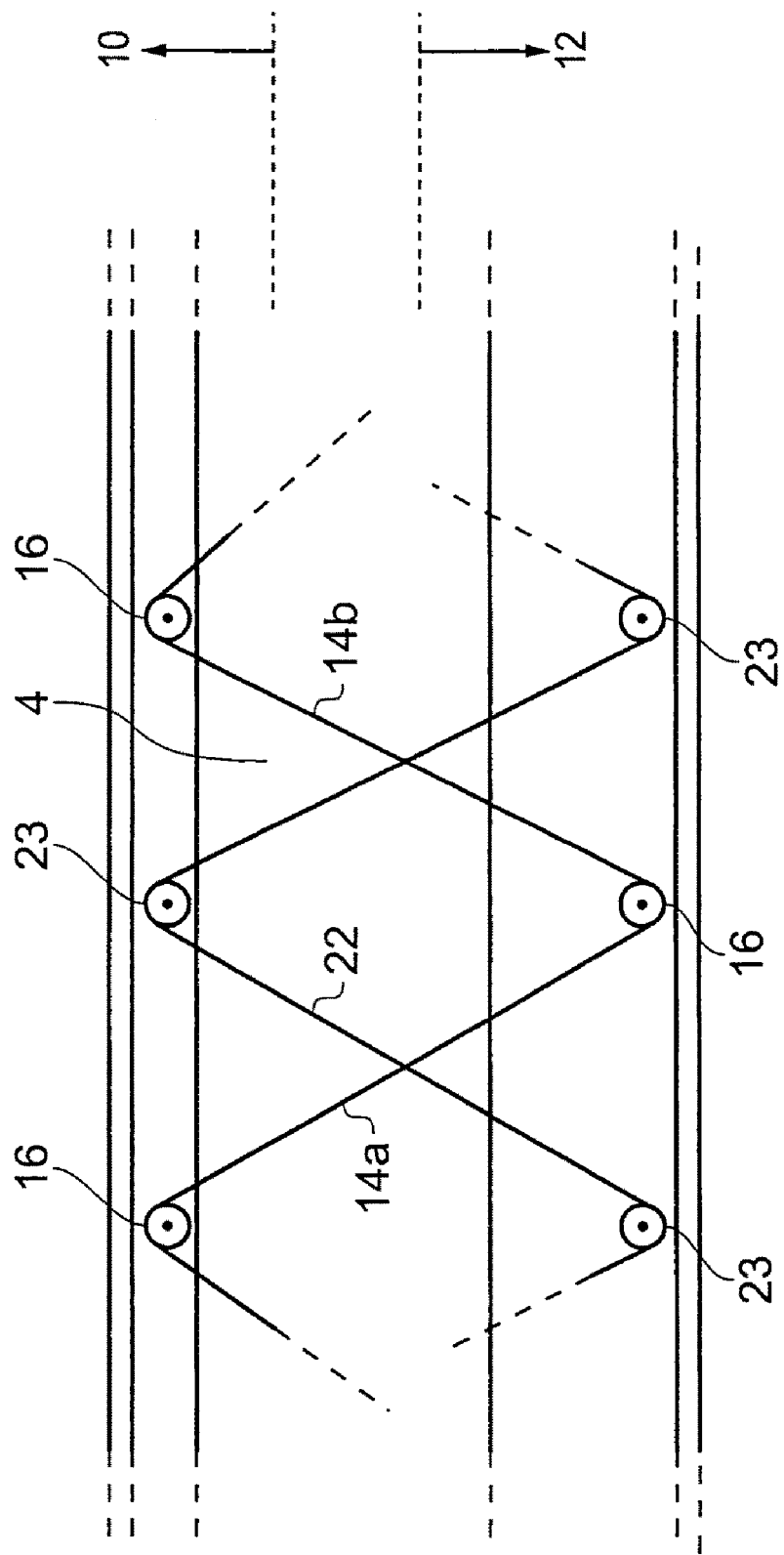
FIG. 2 is a schematic representation of part of the fan casing assembly in FIG. 1.

The retaining cable arrangement comprises a first, continuous length of retaining cable 14 which extends circumferentially around the fan casing 2 on the outside of the containment material 4, substantially parallel to the casing section 2b when viewed in cross-section in FIG. 1. The cable 14 passes between a circumferential series of pulleys 16, mounted in fixed position alternately on the first portion 10 and the second portion 12, which "rollably" secure the cable 14 between the casing portions 10, 12 in a zig-zag configuration, somewhat similar to a common shoe lace configuration in a lace-up shoe, or possibly a corset. The relative locations of the pulleys 16 and the consequent zig-zag configuration of the cable 14 are best appreciated in FIG. 2 (from which it will also be appreciated that in FIG. 1 the pulleys 16 are not in the same radial plane).

The pulleys 16 are fixedly mounted to the casing portions 10, 12 by mounting brackets 18, which are bolted through the attachment flanges on the respective casing sections 2a, 2b and 2b, 2c by corresponding bolts 20, although in general any suitable means may be used to secure the pulleys 16 to the casing portions 10, 12.

The retaining cable 14 thus effectively forms a series of cable "spans" 14a, 14b etc secured between the casing portions 10, 12. The cable span 14a, 14b axially anchor the casing portions 10, 12 to one another to limit axial separation of the casing portions 10, 12 following structural weakening of fan casing 2 caused by the trepanned area 8.

In order to reduce the possibility of a snapping tension being exerted by a detached fan blade on the retaining cable 14 during an FBO event, the retaining cable 14 is provided with a suitable amount of overall slack for accommodating corresponding radial deflection of the underlying containment material 4. It will be appreciated that the pulleys 16 and retaining cable 14 co-operate so that the overall slack in the cable 14 may be taken up by any one of the individual cable spans 14a, 14b etc according to the particular circumferential position of the fan blade impact, with the relative length of the respective cable span increasing accordingly to accommodate radial deflection of the containment material 4. The effect is illustrated in FIG. 1, which shows the cable span 14a in solid line before radial deflection of the containment material 4, and in phantom during radial deflection of the underlying containment material 4, with the cable span 14a having taken up some of the overall slack in the cable 14 (the radial deflection of the containment material 4 itself is not illustrated in FIG. 1, for clarity). In the case where a circumferential wave travels around the containment material 4, each respective cable span 14a, 14b may in turn take up some or all of the overall slack in the cable 14 according to the instantaneous position of the circumferential wave.

The overall slack in the cable 14 admits an initial axial separation of the casing portions 10, 12 in order to tension the cable spans 14a, 14b etc between the casing portions 10, 12 before the cable spans 14a, 14b etc can perform their axial retaining function.

However, because the overall slack in the cable 14 will be averaged between the respective multiple cable spans 14a, 14b etc during axial separation of the casing portions 10, 12, the slack available for take up by any one individual cable span 14a, 14b etc during initial tensioning of that cable span will be comparatively small. Consequently, the initial axial separation of the casing portions 10, 12 required to tension the cable spans 14a, 14b etc will be significantly less than the overall length of slack in the cable 14. It should be noted here that reference to axial separation of the casing portions 10, 12 is not a reference only to a complete separation of the casing portions 10, 12 along the axis of the fan casing 2 (see FIG. 1), with consequent tensioning of all of the cable spans 14a, 14b. It is possible for example that the casing portions 10, 12 may break away only partly, possibly in a hinging movement, in which case only a smaller number of the cable spans 14a, 14b etc may be placed under tension, with the overall slack in the cable 14 nevertheless being averaged between the "active" cable spans.

The actual axial separation of the casing portions 10, 12 required to tension the cable spans 14a, 14b etc is determined both by the number of cable spans and the overall slack in the cable 14, which may each conveniently be set accordingly within the design constraints for a given application (the overall slack itself being likely to be determined, inter alia, by the specific flexibility of the containment material 4). It should be noted here that whilst increasing the number of cable span density will maximise the number of active cable spans during partial breaking away of the casing portions, this may also increase the likelihood of the containment material 4 exerting an outward radial force simultaneously on more than one cable span at a time following fan blade impact, effectively reducing the amount of slack available to each of these individual cable spans for accommodating the radial deflection of the containment material 4. Thus as the number of spans is increased, the amount of slack should also be increased. There is a positive relationship between the number of spans and the amount of required slack, where the relationship may be linear or non linear.

By way of example, in the Trent 700 engine, manufactured by Rolls Royce Plc, suitable results may be obtained for a Kevlar®-wrapped fan casing by employing an overall slack of 20 cm in the cable 14 and providing ten or more cable spans 14a, 14b, 14c around the fan casing.

The retaining arrangement may further comprise a second retaining cable 22, similar to the first retaining cable 14. The second retaining cable, which is primarily a "back-up" cable for the first retaining cable 14, similarly extends circumferentially around the fan casing 2 in a zig-zag configuration (again, best viewed in FIG. 2), passing between a corresponding reciprocal circumferential series of pulleys 23. The first and second retaining cables 14, 22 thus extend around the fan casing 2 in a "double zig-zag" configuration, again somewhat similar to a common configuration of laces in a lace-up shoe or corset. The operation of the second retaining cable 22 is the same as the first retaining cable 14.

Figure 3:
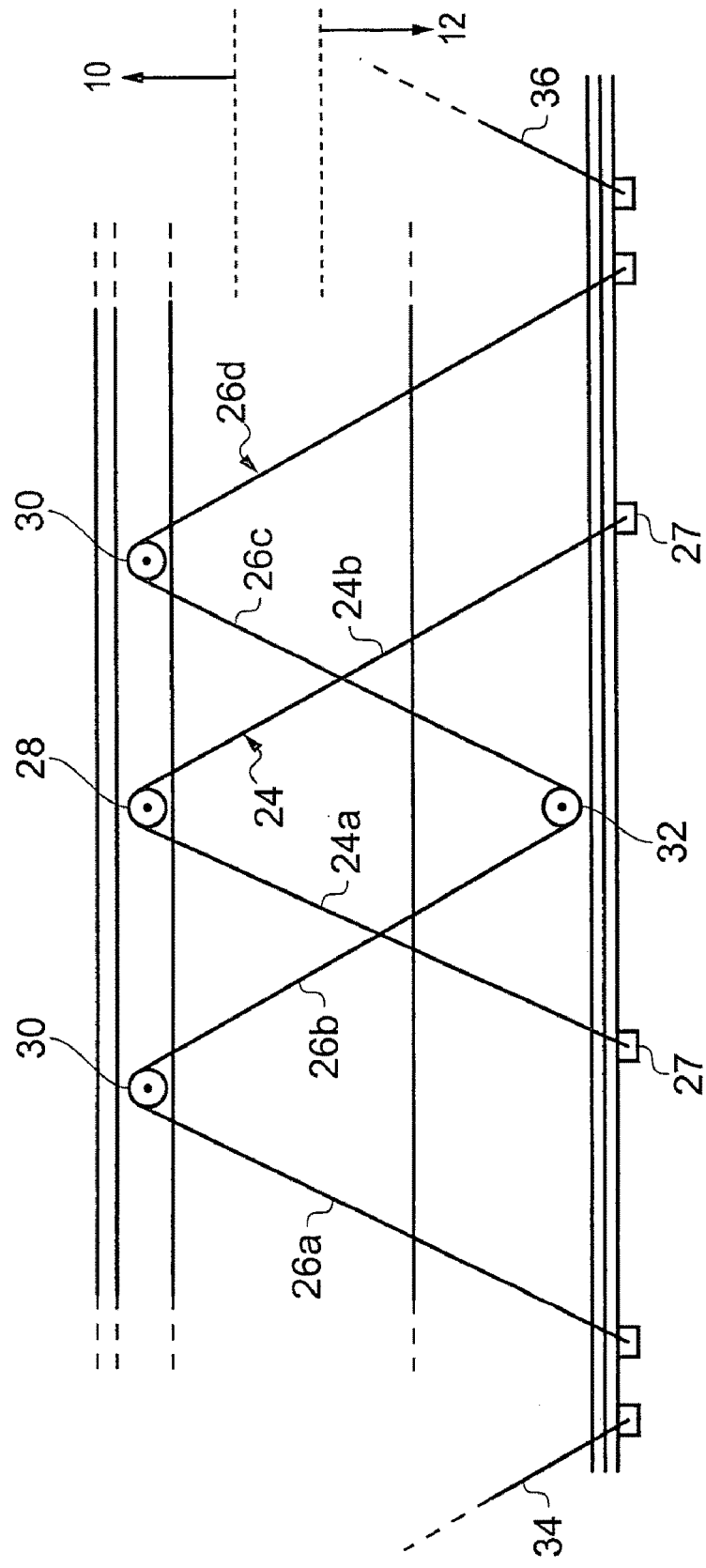
FIG. 3 is a schematic representation corresponding to FIG. 2, but illustrating aspects of alternative embodiments of a fan casing assembly in accordance with the present invention.

The retaining cable arrangement need not utilise a continuous cable. FIG. 3 shows lengths of retaining cable 24, 26 which are attached to the casing portion 12 at each end by fixed anchorages 27 and which, intermediate their two ends, are secured by a pulley to the casing portion 10. In the case of retaining cable 24, the cable is secured to the casing portion 10 by a single pulley 28. In the case of retaining cable 26, this is secured to the casing portion 10 by two pulleys 30, and is additionally secured to the casing portion 12 by a third pulley, 32.

Each of the retaining cables 24, 26 is provided with sufficient slack to accommodate radial deflection of the underlying containment material 4 and operates in similar manner to the continuous retaining cables 14, 22. Thus, taking the retaining cable 24 as an example, in the case of a fan blade impact either one of the respective two cable spans 24a, 24b may take up some or all of the overall slack in the cable 24 in order to accommodate any consequent radial deflection of the underlying containment material 4. At the same time, upon initial axial separation of the casing portions 10, 12, the pulley 28 will tension each cable span 24a, 24b against the fixed anchorages 27 and the amount of slack taken up by each individual cable span 24a, 24b will be one half of the overall slack in the cable 24, limiting the axial separation of the casing portions accordingly.

It will be appreciated that two cable spans 24a, 24b is the minimum number of cable spans which may be provided in accordance with the invention; nevertheless, provision of only two cable spans may still be sufficient to limit the axial separation of the casing portions 10, 12 in the case where the overall slack in the cable need only be relatively small (or where a relatively large axial separation of the casing portions 10, 12 can be tolerated, even if this is for a short time). Additional cable spans can be provided as appropriate according to the application. For example, in the retaining cable 26, three cable spans 26a, 26b, 26c and 26d are provided.

One or more suitable lengths of retaining cable may extend circumferentially around the fan casing 2. For example, FIG. 3 shows additional lengths of retaining cable 34, 36 circumferentially either side of the retaining cable 24,26. Lengths of retaining cable may also be arranged in a double zig-zag, as illustrated by retaining cables 24 and 26 in FIG. 3, with each of the retaining cables thus acting as a back-up cable for the other retaining cable.

The retaining cable may be rollably or slidably secured to the casing portions 10, 12 by any suitable means, and need not be secured specifically by means of pulleys 16. FIG. 4a shows part of an alternative slidable securing arrangement where the retaining cable 14 extends through a flexible guide tube 38 which is fixedly mounted to the attachment flanges on the casing sections 2a, 2b (or equally 2b, 2c) by a suitable mounting bracket 40. As best shown in FIG. 4b, the flexible guide tube 38 may flex to better accommodate deflection of a respective cable span 14a, whilst nevertheless securing the cable 14 to the respective casing sections 2a, 2b.

The use of a zig-zag configuration for the retaining cable, whilst considered advantageous, is not essential, and more complicated configurations may be used where appropriate or desirable.

Although in the embodiments described the retaining cable is substantially inextensible, the cable may alternatively be an elastomeric cable.

The invention claimed is:

1. A fan casing assembly for a gas turbine, the assembly comprising:
   a fan casing for surrounding a fan;
   a resilient, flexible containment material around an outside of the fan casing for containing a detached fan blade that breaches the fan casing during a fan blade off event; and
   a retaining cable arrangement for resisting separation of a first and second portion of the fan casing as a result of the detached fan blade that breaches the fan casing,
   wherein the cable arrangement comprises:
   a length of retaining cable on an outside of the containment material, the length of retaining cable being anchored at each end to a fixed anchorage on the first portion of the fan casing and further being slidably or rollably secured to the second portion intermediate the two ends to form respective cable spans between the fan casing portions, there being sufficient overall slack in the cable for accommodating radial deflection of the underlying containment material upon impact of the detached fan blade.

2. The fan casing assembly according to claim 1, wherein the length of retaining cable is additionally slidably or rollably secured to the second portion intermediate the two ends.

3. The fan casing assembly according to claim 2, wherein the length of cable is slidably or rollably secured to one or both of the first and second portions at a plurality of points intermediate the two ends.

4. The fan casing assembly according to claim 3, wherein the length of retaining cable is slidably or rollably secured between the first and second portions in a zig-zag configuration intermediate the two ends.

5. The fan casing assembly according to claim 1, comprising a plurality of the length of retaining cable.

6. The fan casing assembly according to claim 1, wherein the retaining cable extends circumferentially around the fan casing.

7. A gas turbine engine incorporating the fan casing assembly according to claim 1.

* * * * *